(12) United States Patent
Kazem et al.

(10) Patent No.: US 11,732,172 B2
(45) Date of Patent: Aug. 22, 2023

(54) METHOD OF SYNTHESIZING A THERMALLY CONDUCTIVE AND STRETCHABLE POLYMER COMPOSITE

(71) Applicant: CARNEGIE MELLON UNIVERSITY, Pittsburgh, PA (US)

(72) Inventors: Navid Kazem, Pittsburgh, PA (US); Michael D. Bartlett, Ames, IA (US); Carmel Majidi, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 149 days.

(21) Appl. No.: 16/766,121

(22) PCT Filed: Jan. 4, 2019

(86) PCT No.: PCT/US2019/012351
§ 371 (c)(1),
(2) Date: May 21, 2020

(87) PCT Pub. No.: WO2019/136252
PCT Pub. Date: Jul. 11, 2019

(65) Prior Publication Data
US 2020/0362218 A1 Nov. 19, 2020

Related U.S. Application Data

(60) Provisional application No. 62/709,065, filed on Jan. 5, 2018.

(51) Int. Cl.
| | |
|---|---|
| C09K 5/14 | (2006.01) |
| C08G 77/04 | (2006.01) |
| C08J 3/20 | (2006.01) |
| C08K 3/08 | (2006.01) |
| H01B 1/22 | (2006.01) |
| C08K 3/02 | (2006.01) |
| C09K 5/10 | (2006.01) |
| C08K 3/10 | (2018.01) |

(52) U.S. Cl.
CPC .............. *C09K 5/14* (2013.01); *C08G 77/04* (2013.01); *C08J 3/203* (2013.01); *C08K 3/02* (2013.01); *C08K 3/08* (2013.01); *C08K 3/10* (2013.01); *C09K 5/10* (2013.01); *H01B 1/22* (2013.01); *C08K 2201/001* (2013.01); *C08K 2201/005* (2013.01)

(58) Field of Classification Search
CPC . C09K 5/14; C09K 5/10; C08G 77/04; C08G 71/04; C08G 81/08; C08J 3/203; C08J 3/005; C08J 3/20; C08J 2307/00; C08J 2300/24; C08J 2300/26; C08J 2375/04; C08J 2383/04; C08J 2391/06; C08J 2391/00; C08K 3/08; C08K 3/02; C08K 3/10; C08K 3/05; C08K 2201/001; C08K 2201/005; H01B 1/22; H01B 1/12; H01B 1/20
See application file for complete search history.

(56) References Cited

U.S. PATENT DOCUMENTS

| | | | |
|---|---|---|---|
| 5,352,037 A | 10/1994 | Jouvin | |
| 5,445,308 A * | 8/1995 | Nelson | ........... C09J 9/02 228/121 |
| 6,284,817 B1 * | 9/2001 | Cross | ........... C08K 3/08 523/220 |
| 2003/0027910 A1 * | 2/2003 | Misra | ........... H01B 3/306 524/277 |
| 2010/0096015 A1 * | 4/2010 | Robinson | ........... C23C 18/1216 136/265 |
| 2012/0178851 A1 | 7/2012 | Fernandez Fernandez | |
| 2017/0218167 A1 | 8/2017 | Majidi et al. | |

FOREIGN PATENT DOCUMENTS

JP 2003-234586 A 8/2003

OTHER PUBLICATIONS

Underhill, et al. "Polymer Assessment for Magnetic Shape Memory Alloy Composites", Mater. Res. Soc. Symp. Proc. vol. 977 (2006), 1301. Published via MRS Online Proceedings Library May 1, 2007 (Year: 2007).*

High Viscocity Mixers, White Mountain Process, Apr. 2, 2017, retrieved from http://www.wmprocess.com/high-viscosity-mixers/>, 7 pages.

Kazem et al., Extreme Toughening of Soft Materials with Liquid Metal, Supplementary Information, Advance Materials, Wiley-Vch Verlag GmbH & Co., Weinheim, Germany, 2017, 8 pages.

Kazem et al., Extreme Toughening of Soft Materials with Liquid Metal, Advance Materials, Wiley-Vch Verlag GmbH & Co., Weinheim, Germany, 2018, 30, 7 pages.

Fassler et al., Liquid-Phase Metal Inclusions for a Conductive Polymer Composite, Advance Materials, Wiley-Vch Verlag GmbH & Co., Weinheim, Germany, 2015, 5 pages.

(Continued)

*Primary Examiner* — Jane L Stanley
(74) *Attorney, Agent, or Firm* — K&L Gates LLP

(57) ABSTRACT

A method for synthesizing a thermally conductive and stretchable elastomer composite comprises mixing liquid metal and soft material (e.g., elastomer) in a centrifugal or industrial shear mixer under conditions such that the liquid metal forms microscale liquid metal droplets that are dispersed in the soft elastomer. Liquid metal-embedded elastomers, or "LMEEs," formed in this manner dramatically increase the fracture energy of soft materials up to 50 times over an unfilled polymer. This extreme toughening is achieved by means of (i) increasing energy dissipation, (ii) adaptive crack movement, and (iii) effective elimination of the crack tip. Such properties arise from the deformability and dynamic rearrangement of the LM inclusions during loading, providing a new mechanism to not only prevent crack initiation, but also resist the propagation of existing tears for ultra-tough, highly functional soft materials.

23 Claims, 11 Drawing Sheets

(56) References Cited

OTHER PUBLICATIONS

Jeong et al., Mechanically Stretchable and Electrically Insulating Thermal Elastomer Composite by Liquid Alloy Droplet Embedment, Scientific Reports, 5, 18257, Dec. 16, 2015, 10 pages.
International Search Report and Written Opinion of the International Searching Authority for International Application No. PCT/US19/12351 dated Mar. 8, 2019.
Jawed et al., Soft-Matter Electronics and Multifunctional Materials with Polydisperse Liquid Metal Suspensions, 2017 IEEE International Symposium on Antennas and Propagation & USNC/URSI National Radio Science Meeting, pp. 417-418.
Dickey et al., Eutectic Gallium-Indium (EGaIn): A Liquid Metal Alloy for the Formation of Stable Structures in Microchannels at Room Temperature, Adv. Funct. Mater., 2008, 18, pp. 1097-1104.
Verdejo et al., Graphene filled polymer nanocomposites, J. Mater. Chern., The Royal Society of Chemistry, 2010, 11 pages.
Joshipura et al., Methods to pattern liquid metals, J. Mater. Chem., The Royal Society of Chemistry, Mar. 2015, 11 pages.

\* cited by examiner

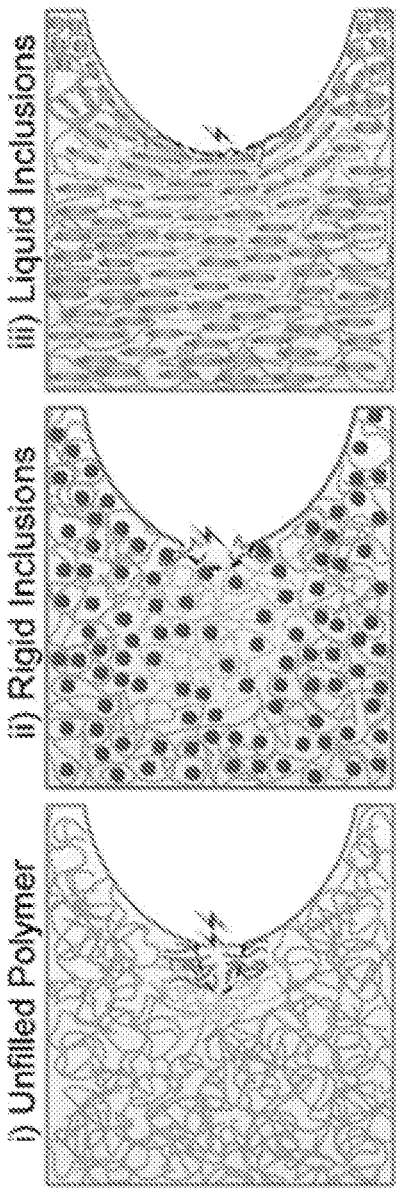
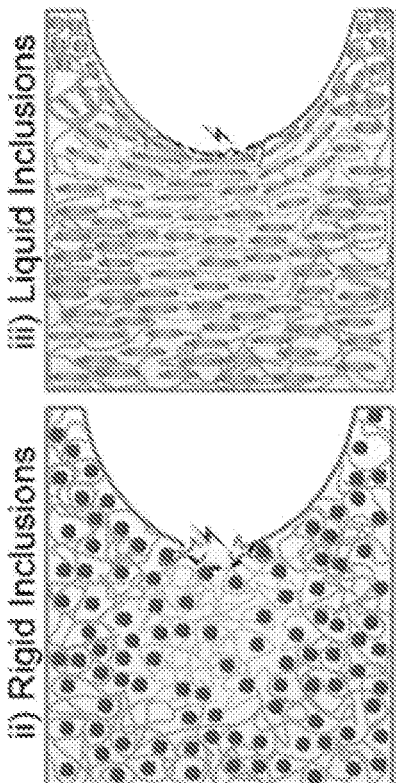
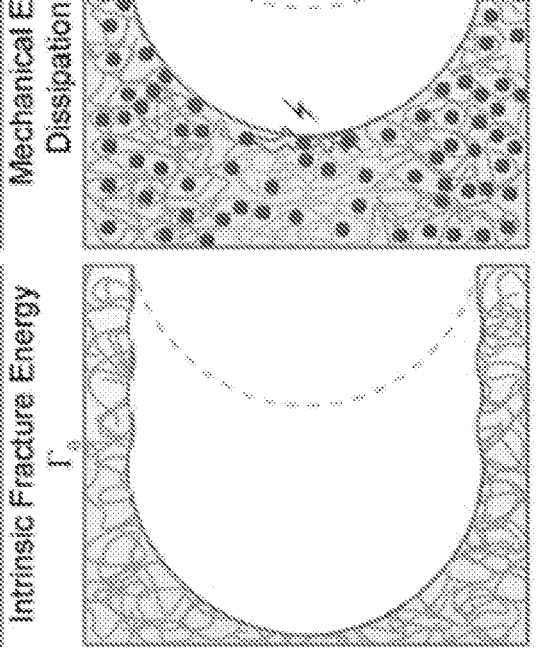
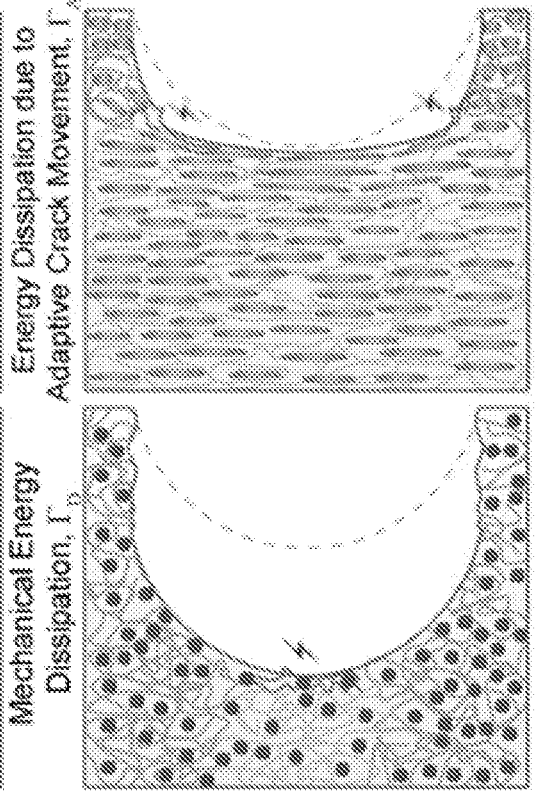
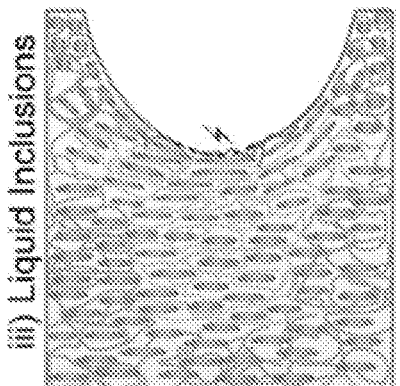
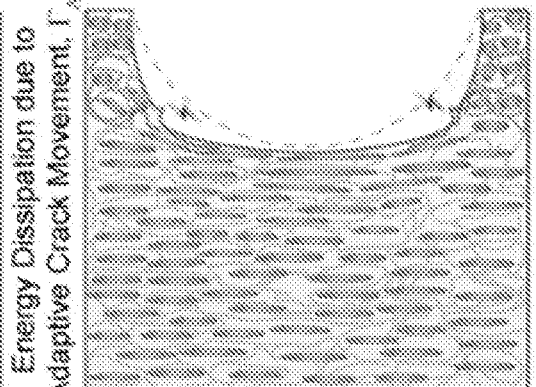

METHOD OF SYNTHESIZING A THERMALLY CONDUCTIVE AND STRETCHABLE POLYMER COMPOSITE

PRIORITY CLAIM

The present application is a national stage application under 35 U.S.C. § 371 of PCT application Serial No. PCT/US19/12351, filed Jan. 4, 2019, which claims priority to U.S. provisional patent application Ser. No. 62/709,065, filed Jan. 5, 2018, which is incorporated herein by reference.

STATEMENT REGARDING FEDERALLY-SPONSORED RESEARCH AND DEVELOPMENT

This invention was made with government support under No. 1635824 awarded by U.S. National Science Foundation Materials Engineering and Processing program. The U.S. government has certain rights in the invention.

BACKGROUND

Natural materials like skin and bone have extreme toughness because of their ability to dissipate mechanical energy at multiple length scales and deflect or blunt the tip of an advancing crack. In bone, for example, it requires far more energy ($\Gamma \approx 31,000$ J m–2) to extend a short crack (500 μm) through the cross section than to split it along the length ($\Gamma \approx 50$-200 J m–2), which results in crack deflection/twist and an increase in the resistance to crack propagation Additionally, soft biological tissues like rabbit skin are extremely difficult to tear because they are composed of fibril networks that adapt their microstructure by means of straightening, reorienting, stretching and sliding to redistribute internal load and dissipate energy. However, whereas natural materials use multiscale, multimodal mechanisms for toughening, most existing synthetic materials only exploit energy dissipation in the proximity of a crack through molecular and mesoscale dissipative mechanisms. In the case of traditional, particle-filled polymers and elastomers, energy dissipation and reinforcing effects have been designed through the bonding and composition of the polymer and filler. Moreover, fiber-reinforced gels and elastomers have shown an increase in critical fracture energy due to the dissipation of energy during fiber pull out. In addition to increasing fracture toughness, however, these approaches alter the bulk mechanical response of the material, typically observed as a dramatic increase in stiffness or tensile modulus relative to the unfilled gel or elastomer. This stiffness increase is typical for rigid filler systems and is limiting for emerging applications in wearable computing, medical devices, and soft robotics that require high mechanical compliance, high deformability and toughness. Recently, many studies have also focused on fabricating soft and tough hydrogels. One of the most successful approaches is to create double networks (DN) of interpenetrated polymers. In DN hydrogels, one of the networks breaks upon stretching and dissipates most of the applied mechanical work while the other network maintains structural integrity and provides stretchability. While extensive developments in DN hydrogel engineering have resulted in materials with 0.1-1 MPa stiffness and fracture energies of $10^2$-$10^4$ J m$^{-2}$, the synthesis is highly specialized and only a few polymers (polyacrylamide (PAAM), alginate, and agar) have been used to achieve DN architectures. Progress in this field depends on discovering new architectures to enhance fracture toughness by combining energy dissipating mechanisms with the ability to deflect crack tip efficiently without introducing extreme stiffness in composites, and that are compatible with a broader range of soft materials.

SUMMARY

In one general aspect, the present invention is directed to a method for synthesizing a thermally conductive and stretchable composite. The synthesis method comprises, according to various embodiments, mixing liquid metal and a soft material, such as a soft elastomer, under conditions such that the liquid metal forms microscale liquid metal droplets that are dispersed in the soft elastomer. The mixing could be performed, for example, with, at least in part, a centrifugal mixer or an industrial shear mixer, for example. Liquid metal-embedded elastomers, or "LMEEs," formed in this manner dramatically increase the fracture energy of soft materials up to 50 times over an unfilled polymer. This extreme toughening is achieved by means of (i) increasing energy dissipation, (ii) adaptive crack movement, and (iii) effective elimination of the crack tip. Such properties arise from the deformability and dynamic rearrangement of the LM inclusions during loading providing a new mechanism to not only prevent crack initiation, but also resist the propagation of existing tears for ultra-tough, highly functional soft materials.

These and other benefits of the present invention will be apparent from the description that follows.

FIGURES

Various embodiments of the present invention are described herein by way of example in connection with the following figures.

Figure 4A:
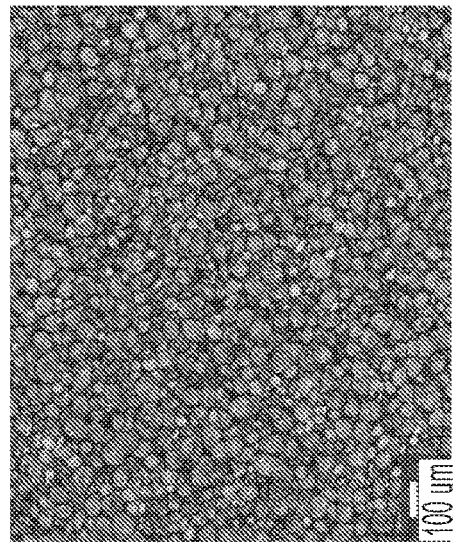
Figure 4B:
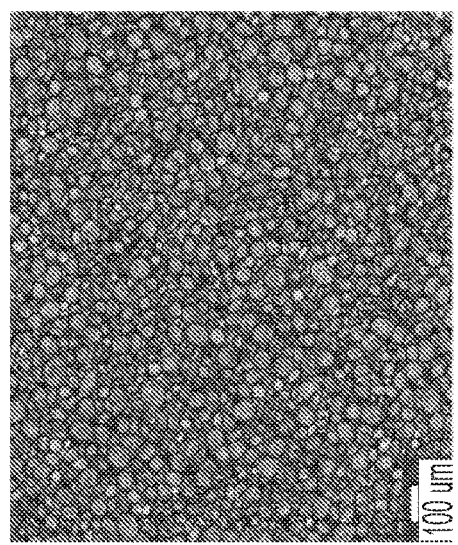
Figure 4C:
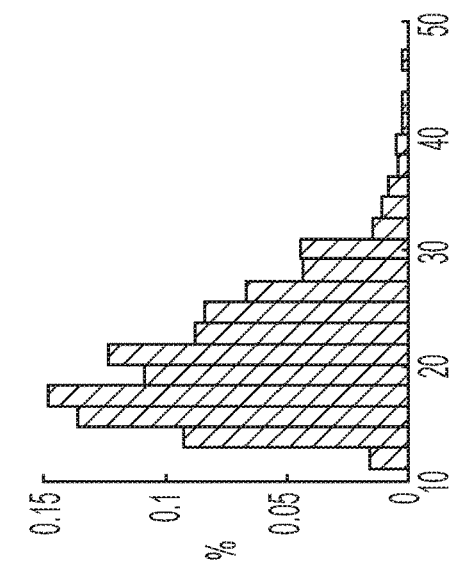
Figure 5A:
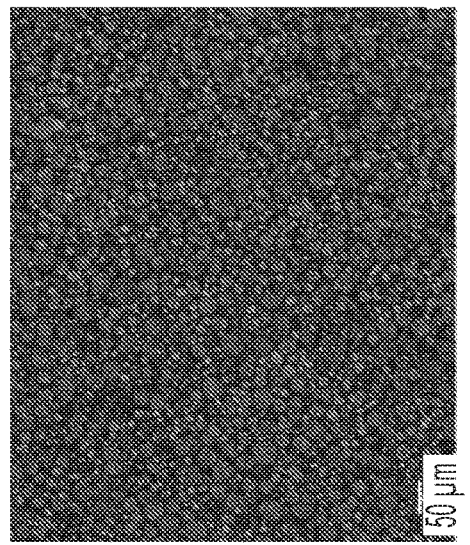
Figure 5B:
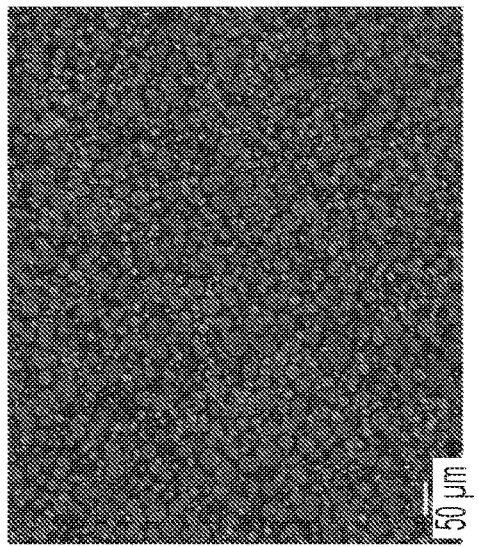
Figure 5C:
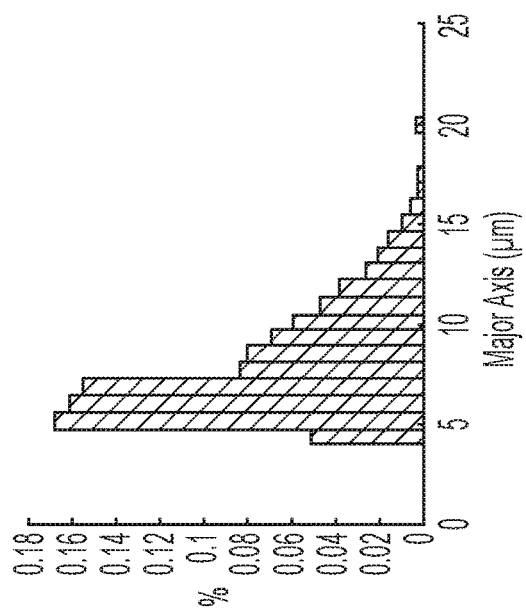
Figure 6:
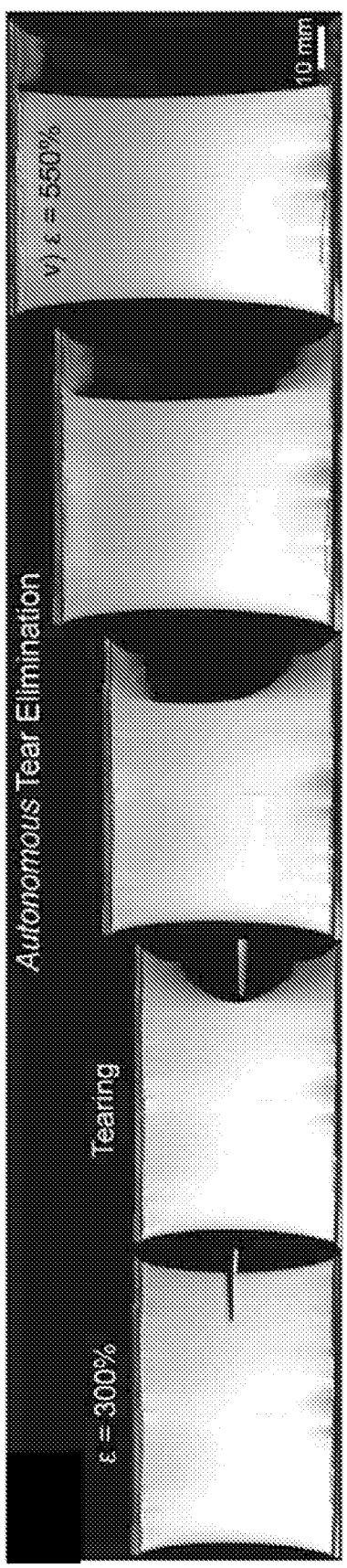

FIGS. 4A-B and 5A-B show LMEEs according to various embodiments of the present invention, while FIGS. 4C and 5C show the LM droplet size distributions for the LMEEs shown in FIGS. 4A-B and 5A-B, respectively;

FIG. 6 illustrates the extreme tear resistance of LMEE by adding a notch to a 50% LM volume ratio sample stretched to 300% strain. As stretching continues, the notch is completely blunted through an autonomous tear elimination mechanism.

FIGS. 7A-B, 8A-B and 9A-B are schematics illustrating different mechanisms of dissipating external mechanical work in a notched sample. FIGS. 7A-B show what in an unfilled polymer, energy dissipation arises from intrinsic dissipation as polymer chains break, $\Gamma_0$. FIGS. 8A-B show that the addition of rigid inclusions increases the size of the process zone and enhances the fracture energy by increasing mechanical dissipation, $\Gamma_D$. FIGS. 9A-B show that elongation of liquid droplets creates preferential and adaptive crack deformation that eliminates the notch and increases mechanical dissipation by an amount $\Gamma_A$.

Figure 10:
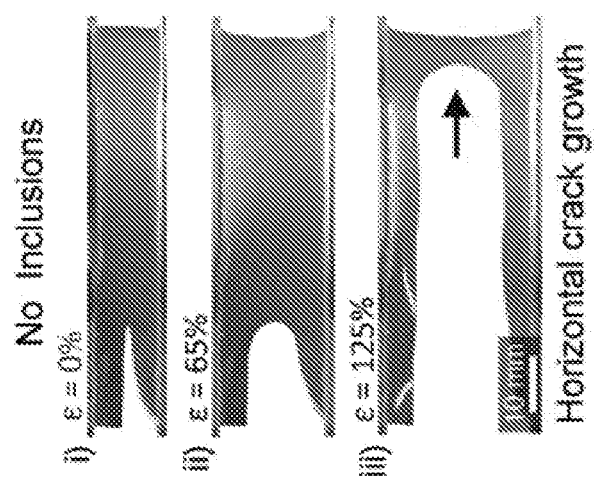

FIGS. 10($i$)-($iii$) show horizontal crack movement in a notched experiment of an unfilled polysiloxane with a sample at i) unstretched state, 65%, and 125% strain.

Figure 11:
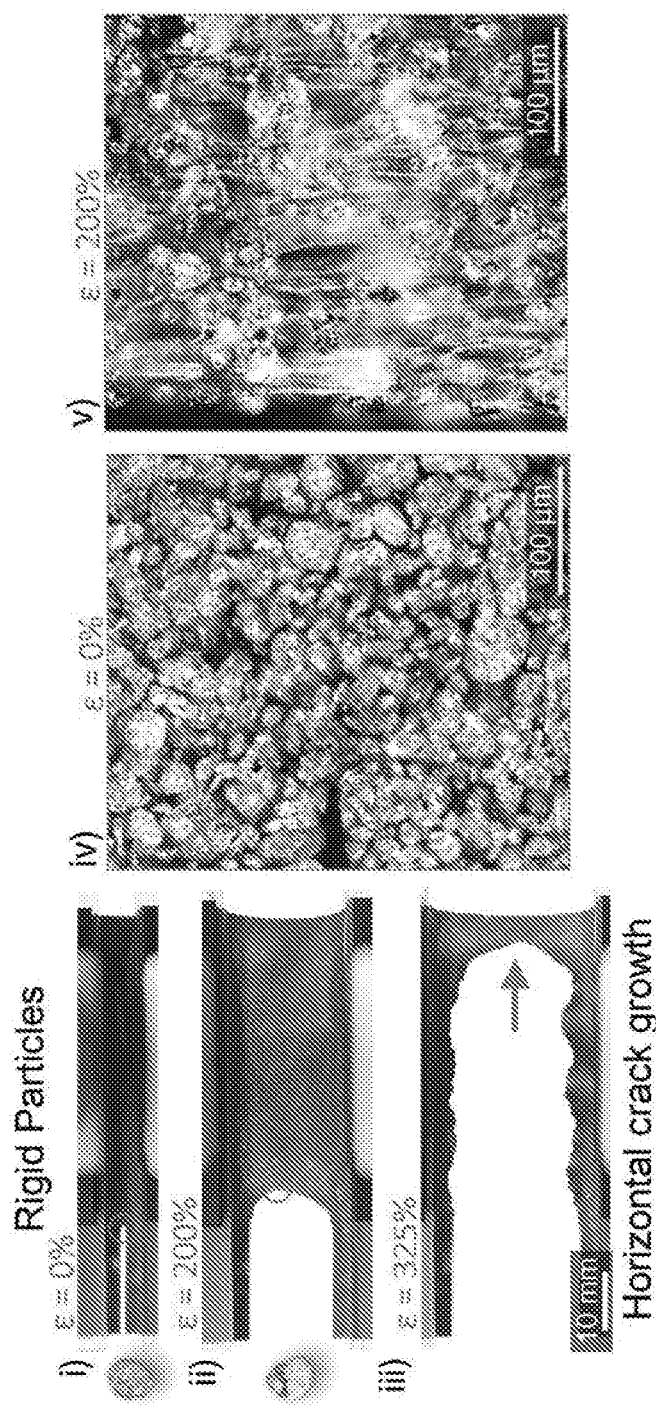

FIGS. 11($i$)-($v$) show similar horizontal crack movement in 30% volume fraction rigid particles at i) unstretched state with a representative inclusion morphology shown, 200% strain where the representative rigid inclusion is undeformed, and 325% strain. Representative optical microscopy images during stretching are shown at (iv) and (v).

FIGS. 12(i)-(ix) show longitudinal crack movement and crack elimination in 50% volume fraction liquid metal inclusions, with the LMEE sample at i) unstretched state with a representative inclusion morphology shown, at 100% strain where the representative liquid inclusion is elongated, iii, iv) with 400% and 500% and vertical tear movement, and at v) 650% where the tear is completely eliminated. The optical microscopy images (vi)-(x) represent the circled regions in the photographs at the corresponding strains.

Figure 13A:
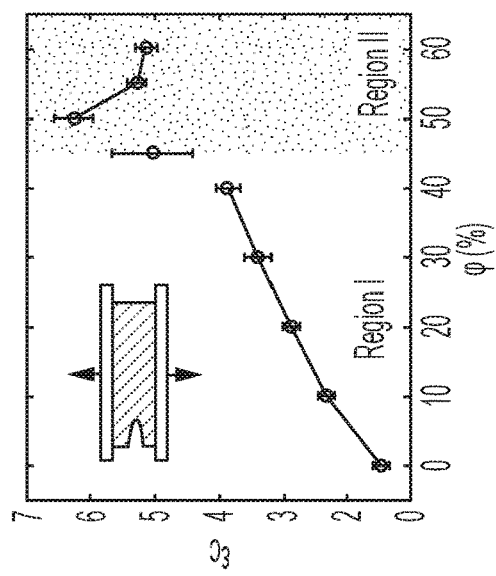
Figure 13B:
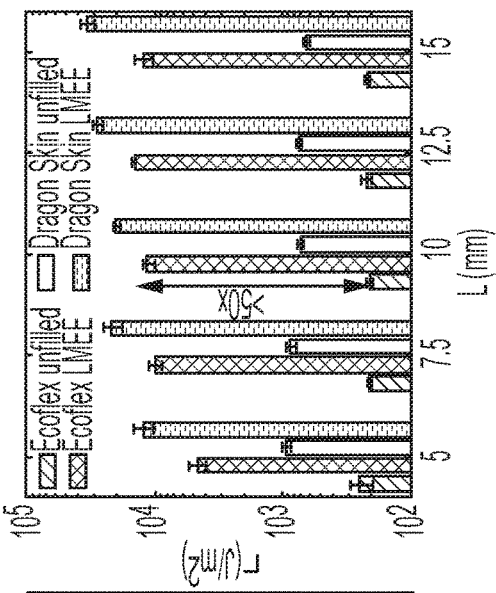

FIG. 13A shows a stress versus strain curve for pure shear tests performed on 70 mm×10 mm samples of unfilled Ecoflex and LMEE with 50% LM volume ratio. Black and dark green are unnotched Ecoflex and LMEE Brown and light green are notched Ecoflex and notched LMEE FIG. 13B shows a comparison between the fracture energy Γ of unfilled Ecoflex (dark gray), 50% volume fraction of LM inside Ecoflex (green), unfilled Dragon Skin (light gray) and 50% volume fraction of LM inside Dragon Skin with higher intrinsic fracture energy (blue)

Figure 13C:
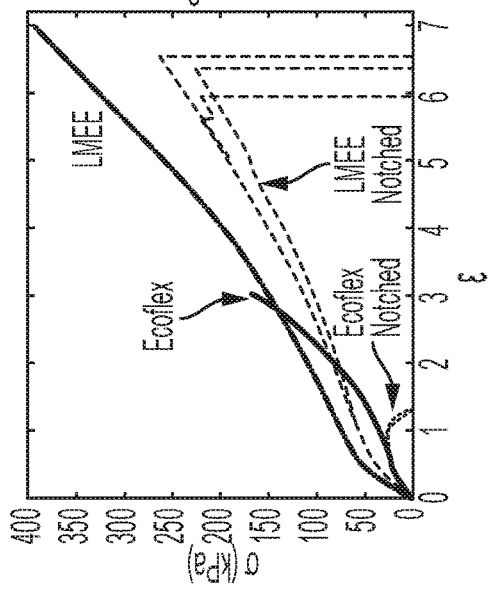

FIG. 13C is a plot of critical strain $\varepsilon_c$ (strain at the maximum force), as a function of LM volume fraction.

Figure 13D:
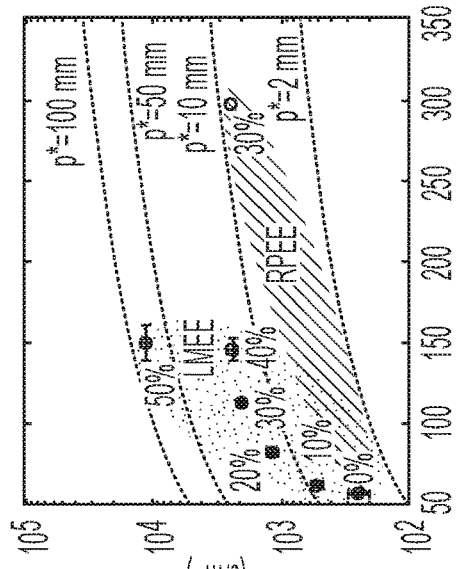

FIG. 13D is a plot showing the increase in fracture energy as a function of LM volume fraction. In region I, the fracture energy enhancement is due to the increase in mechanical dissipation in a similar manner to rigid inclusions (inset). In contrast, for region II, large enhancement is due to a crack deflection and elimination mechanism.

Figure 13E:
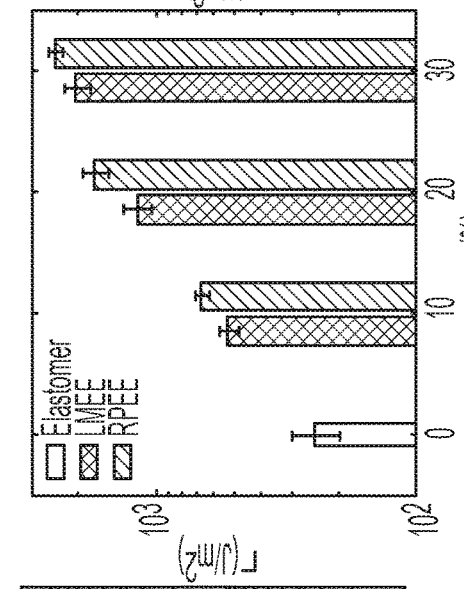

FIG. 13E shows a comparison between fracture energy of LMEE and RPEF in region I.

Figure 13F:
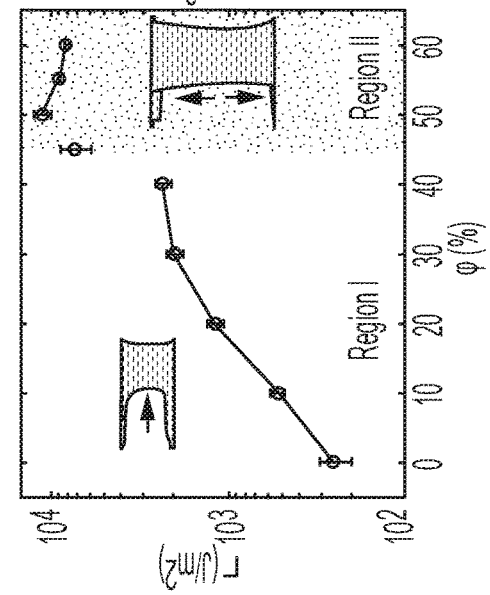

FIG. 13F shows a relation between enhancing the fracture energy and tensile modulus at the first loading cycle of LMEE and RPEF composites. Dashed lines are curves corresponding to different values of the elasto-adhesive length scale, ρ*.

DESCRIPTION

Figure 1A:
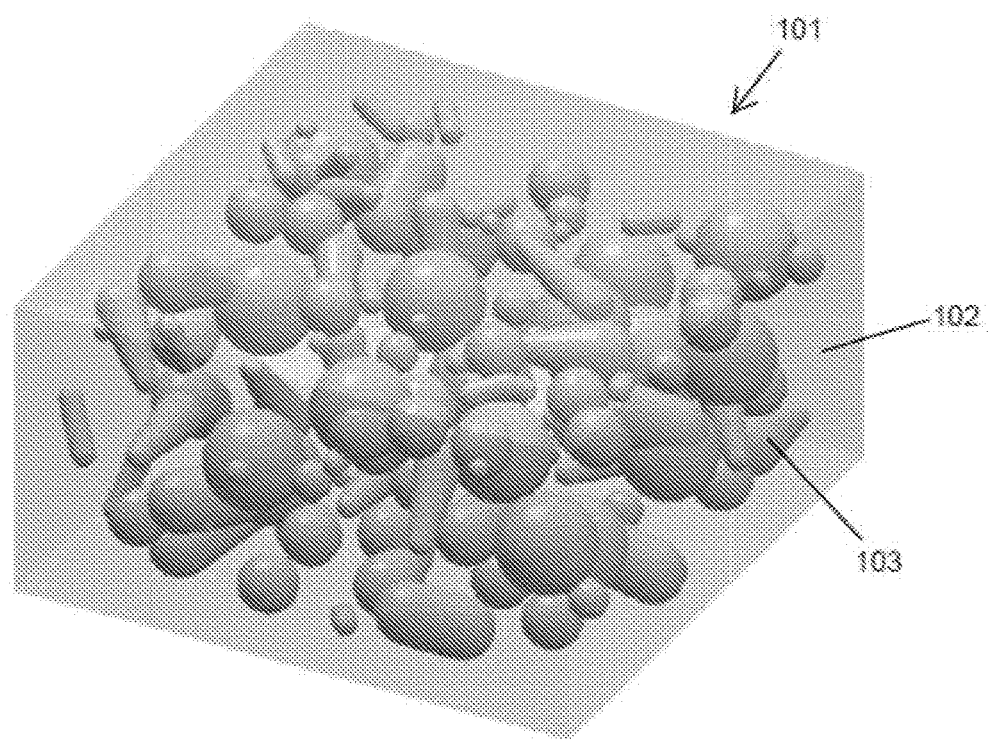
FIGS. 1A through 1C show a LMEE according to various embodiments of the present invention.

In one general aspect, the present invention is directed to a method for synthesizing a thermally conductive and stretchable polymer composite. With reference to FIG. 1A, the composite 101, according to various embodiments, comprise a soft material, such as soft elastomer 102, embedded with a plurality of liquid metal (LM) inclusions 103. For that reason, the composite is sometimes referred to herein as "LM-embedded elastomer" or "LMEE" The elastomer 102 can include materials such as polysiloxane (e.g. silicone, polydimethylsiloxane, RTV silicones), polyurethane, polyacrylate, natural (latex) rubber, block copolymer elastomers (e.g. styrene ethylene butylene styrene), thermoplastic elastomers (e.g. propylene-ethylene co-polymer), and other similar materials. In other embodiments, the soft material may comprise an oil, epoxy and/or wax. The liquid metal 103 can include metals that are liquid at room temperatures, such as eutectic gallium indium (EGaIn), gallium-indium-tin (Galinstan), Indalloy (alloys of tin and antimony), NewMerc (a nontoxic, electrically-conductive, liquid metal alloy alternative to mercury that comprises liquid gallium or gallium alloy, such as gallium-indium-zinc-copper, that is either free of metal oxides or has only very low quantities of metal oxides, as described in U.S. Pat. Nos. 5,508,003 and 5,92, 326, which are incorporated herein by reference), mercury, and other suitable liquid metal.

Figure 1B:
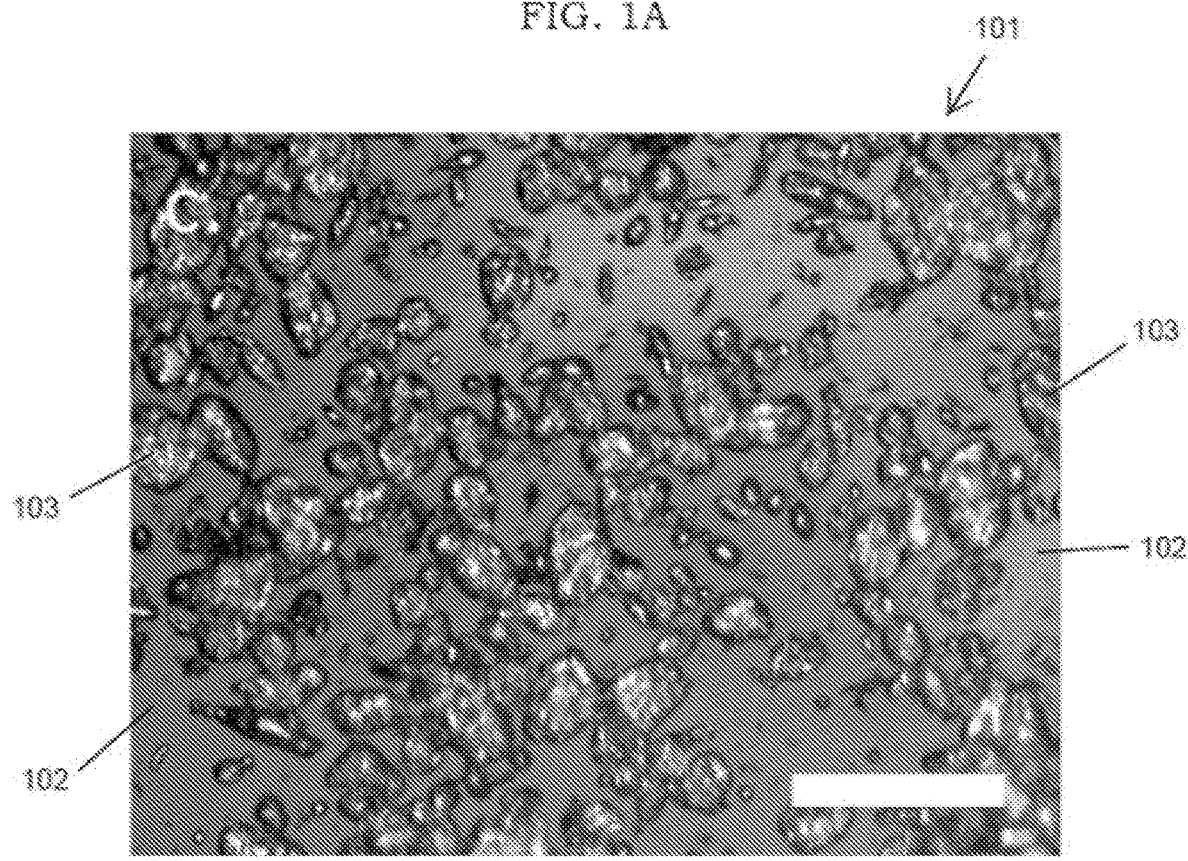
Figure 1C:
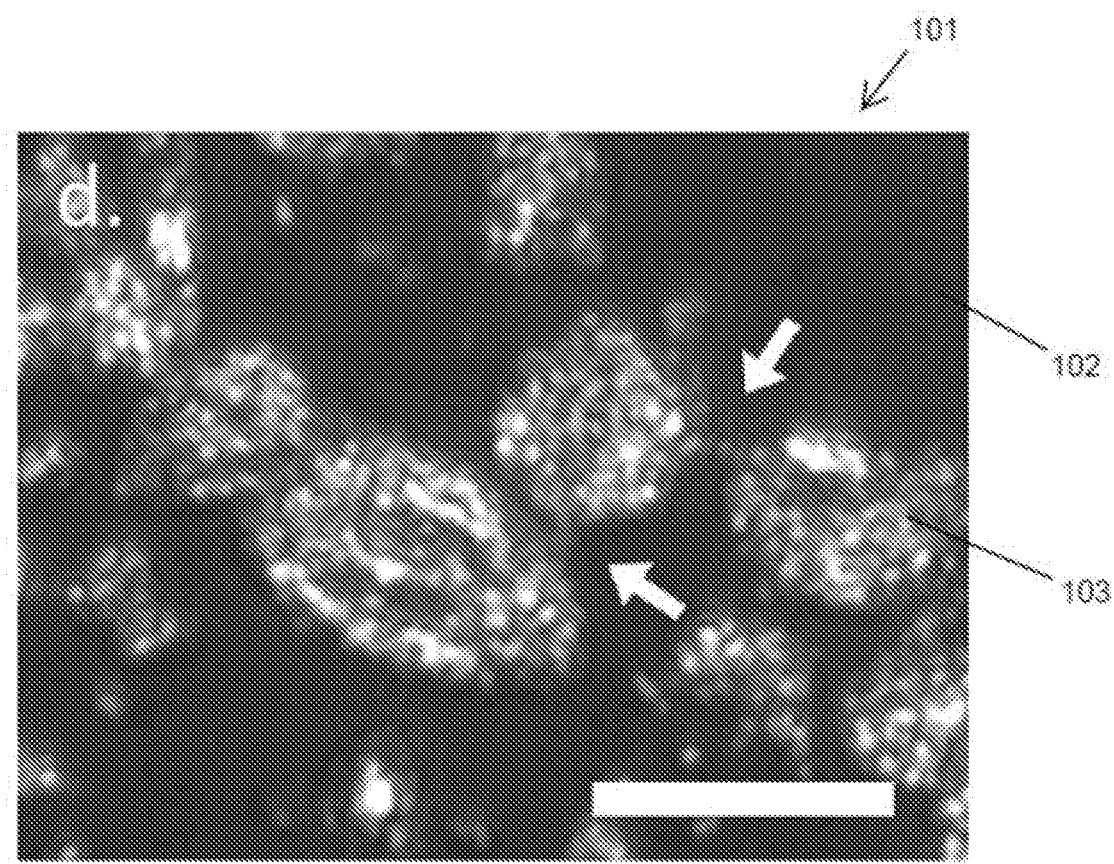

In one example embodiment, the composite 101 comprises a thin sheet of poly(dimethylsiloxane) (PDMS) embedded with microscopic inclusions/droplets 103 of liquid-phase gallium-indium-tin ("Galinstan"; electrical conductivity, σ=3.46×10$^6$ S*m$^{-1}$, melting point=−19° C.), as shown in FIGS. 1A-1C. In this embodiment, the PDMS/Galinstan composite 101 is not initially conductive, but concentrated surface pressure causes a permanent change in the composite's internal structure and bulk properties, resulting in a volumetric conductivity of σ=1.05×10$^4$ S*m$^{-1}$. Because of this, it is possible to selectively induce conductivity in a sheet of the material, allowing simple circuits to be drawn onto the composite 101, as described in U.S. published patent application Pub. No. 2017/0218167, entitled "Polymer Composite with Liquid Phase Metal Inclusions," by Carnegie Mellon University, which is incorporated herein by reference in its entirety. Since the conductive inclusions/droplets 103 are liquid-phase, the bulk material is still highly soft (Young's modulus, E=0.90-1.27 MPa) and elastic, with a strain to failure of $\varepsilon_f$=133% strain (i.e. over twice its natural length). The modulus of the composite 101 is similar to that of natural human skin (0.4-0.8 MPa) and an order-of-magnitude less than striated muscle (~10-50 MPa). This biomechanical compatibility allows the composite 101 to easily conform to the contours of the human body and stretch as the body moves for applications involving wearable technology. Additionally, while under tension the resistance remains approximately constant so that the properties of the circuit are unaffected. Compared to other conductive elastomers using solid phase fillers and having a similar modulus (i.e. carbon black-PDMS and Ag-PDMS with E~1 MPa), this composite 101 exhibits orders of magnitude greater volumetric conductivity.

In another example embodiment, the liquid metal embedded elastomer composite 101 comprises a Pt-catalyzed silicone elastomer 102 embedded with a randomly distributed, polydisperse suspension of non-toxic, liquid-phase eutectic gallium-indium (EGaIn) microdroplets 103. In this embodiment of the composite 101, strain creates thermally conductive pathways through the in-situ elongation of the deformable liquid metal inclusions 103, which significantly enhances thermal conductivity in the stretching direction. For permanent (stress-free) and strain-controlled elongation of the liquid metal inclusions 103, this enhanced k is nearly 25-50 times greater than the unfilled elastomer (0.20±0.01 W/m·K) and approaches the limit for the parallel rule of mixtures of an EGaIn-silicone composition without the aid of percolating networks. The exceptional combination of thermal conductivity, low elastic modulus, and high strain limit allows the LMEE composites 101 to occupy an uncharted region of the material properties space.

Figure 2:
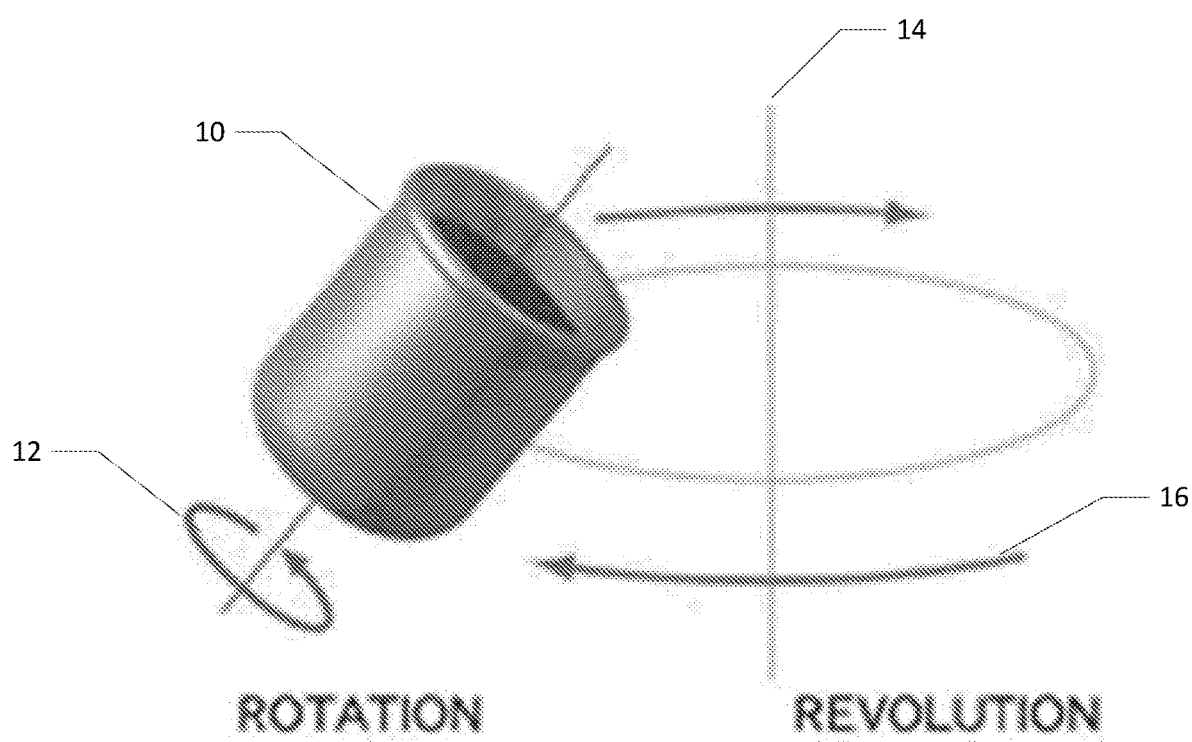
FIG. 2 is a diagram illustrating motion of a planetary centrifugal mixer.
Figure 3:
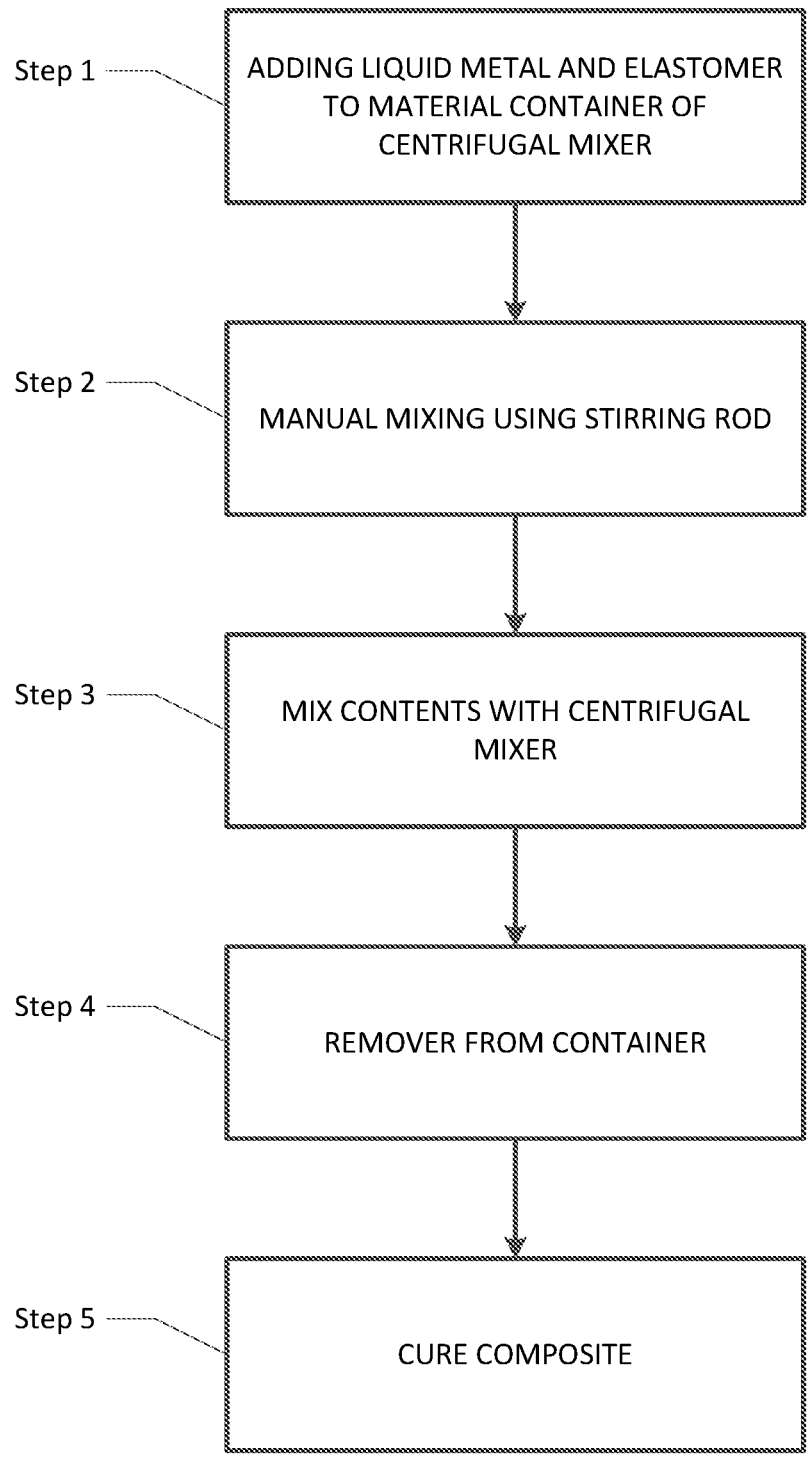
FIG. 3 is a flow chart showing a synthesis process according to various embodiments of the present invention.

According to various embodiments, synthesis (or fabrication) of the composite comprises shear mixing the elastomer 102 (or other soft material) with the liquid metal 103 with a centrifugal mixer, such as a planetary centrifugal mixer, or with an industrial high or ultra high shear mixer. Such mixers cause the liquid metal 103 to, during the mixing process, form the micro-droplets that are dispersed throughout the elastomer 102. The LM droplets dispersed in the elastomer preferably are predominantly microscale, i.e., ellipsoidal with a major axis dimension of 1 to 100 microns. With reference to FIG. 2, a planetary centrifugal mixer is a centrifugal mixer that combines both rotations 12 about a longitudinal axis of the mixer container 10 and revolutions 16 about an axis 14 of revolution. As shown in FIG. 2, the material container 10 may tilted at an angle of for example, about 45 degrees relative to axis 14 of revolution. The material container may rotate at about 800 rpm and revolve at a rate of about 2000 rpm, for example, which results in about a 400 G mixing force, which achieves a fast, homogeneous mix with little or not added air to the material. Of course, in other embodiments, different rotation and revolution rates could be used. Accordingly, with reference to FIG. 3, in various embodiments, the LMEE is synthesized by, at step 1 of FIG. 2, putting the liquid metal 103 and elastomer 102 in the material container 10 according to the desired ratio and, at step 2, mixing the contents manually using a stirring rod for about 5 minutes to eliminate any large, shiny, and visible droplet of liquid metal 103. During step 2 a consistent emulsion of liquid metals 103 and the elastomer 102 is made. At step 3, following step 2, the contents are mixed further with the planetary centrifugal mixer until the LM droplets are formed and dispersed throughout the elastomer 102, which typically takes a matter of minutes to complete. Then, at step 4 the LMEE composite can be removed from the container 10 and cured at step 5. The curing at step 5 may be at room temperature or an elevated temperature. The above-description assumed that the soft material was a soft elastomer. In other embodiments, the soft material may comprise an oil, an epoxy and/or a wax. Also, various steps could be eliminated, such as step 2.

In other embodiments, an industrial high or ultra high shear mixer could be used instead of the centrifugal mixer at step 3. Such an industrial (e.g., 5 to 400 HP) shear mixer may include a dispersion blade or other type of suitable disperser that rotates at a high RPM rate inside the mixing container 10 to disperse the liquid metal droplets in the soft material. The disperser may have a peripheral speed of, for example, several thousand feet per minute. In other embodiments, the shear mixer may comprise an agitator instead of a disperser. Agitators have a large, center mounted low speed blade (compared to a disperser).

In various embodiments, the liquid metal can be 5% to 80% by volume of the resulting composite, and more preferably the liquid metal can be 40% to 60% by volume of the resulting composite. Using a centrifugal mixer or industrial shear mixer to mix the materials provides several advantages over other mixing techniques. For example, using a centrifugal or industrial shear mixer results in more uniform LM droplet size, as shown in FIGS. 4A-C and 5A-C. FIGS. 4A-C show a sample embodiment of the present invention of 50% by volume ratio liquid metal in Ecoflex 00-30 and FIG. 5A-C show a sample embodiment of the present invention of 50% by volume ratio liquid metal in Dragon Skin 10 Slow. FIGS. 4A and 5A show the elastomers prior to embedding of the liquid metal; FIGS. 4B and 5B showing the elastomer after embedding of the liquid metal (i.e., the LMEE); and FIGS. 4C and 5C show the LM droplet size distributions. FIGS. 4C and 5C show that the sizes of the LM droplets, measured by their major axis, are tightly concentrated (about 80%) in the 12 to 30 micron range for the LMEE of FIGS. 4A-B and in the 4 to 15 micro range for the LMEE of FIGS. 5A-5B. Use of a centrifugal or industrial shear mixer also accelerates the mixing process; i.e., it takes less time to mix large quantities of the materials with a centrifugal or industrial shear mixer than with other mixing techniques.

LMEE synthesized according to the above-described techniques can dramatically increase the fracture energy of soft materials up to 50 times (from 250±50 to 11,900±2600 J m$^{-2}$) over an unfilled polymer. For some LMEE compositions according to embodiments of the present invention, the toughness is measured to be as high as 33,500±4300 J m$^{-2}$, which far exceeds the highest value previously reported for a soft elastic material. This extreme toughening is achieved by means of (i) increasing energy dissipation, (ii) adaptive crack movement, and (iii) effective elimination of the crack tip. Such properties arise from the deformability and dynamic rearrangement of the LM inclusions during loading, providing a new mechanism to not only prevent crack initiation, but also resist the propagation of existing tears for ultra-tough, highly functional soft materials.

Liquid droplets dispersed in a soft material can alter its mechanical stiffness. LM alloys like eutectic gallium-indium (EGaIn) are of particular interest because their high conductivity can also be used to tailor the thermal and electrical properties of a wide variety of polymers including silicones, urethanes, and other conventional rubbers. EGaIn is additionally nontoxic and is known to form a thin (1-3 nm) oxide shell in the presence of oxygen. One especially important attribute of these soft heterogeneous systems is that the liquid droplets deform with the matrix and elongate along the direction of loading. This is in contrast to rigid particles, which induce an internal mechanical mismatch that results in a non-uniform deformation with stress concentrations at the particle/matrix interfaces. To demonstrate the extreme resistance of LMEE to tearing, the inventors stretched a sample with 50% volume ratio of LM to 300% strain and cut a notch with a pair of scissors inside the material, as shown in FIG. 6. The testing showed that embedding a polydisperse suspension of randomly distributed droplets of LM alloy can increase fracture energy of the base elastomer by up to 50×.

The inclusion of liquid droplets can provide similar energy dissipation methods that already exist in unfilled polymers and rigid-filler composites, as well as additional dissipative modes, due to tear deflection and elimination. In an unfilled polymer, the fracture energy, $\Gamma_0$, is due to the release of energy in a polymer chain after a failure in one of the atomic bonds, as shown in FIGS. 7A-B. In order to enhance critical fracture energy of a material, the necessity to engineer dissipating mechanisms to absorb the external work is well established. Accordingly, the inclusion of rigid fillers inside a polymer allows the microstructure to dissipate more energy ($\Gamma_D$) through a variety of mechanisms, including load sharing between multiple molecules and one filler particle, slipping of molecular chains from surface of fillers, and detaching polymers from fillers, as shown in FIGS. 8A-B. In contrast to rigid fillers, liquid inclusions can be stretched and elongate with the background strain field and deform into needle-like ellipsoids as the composite is stretched, as shown in FIGS. 9A-B. Such elongation causes the tear to bifurcate and redirect along the direction of stretch. This is in stark contrast to crack propagation in other soft materials, where tears typically propagate in the transverse rather than longitudinal direction, as shown in FIGS. 7i and 7ii. When the tear reaches the top and bottom edges of the LMEE sample, it vanishes and the composite can be stretched to its natural (intrinsic) strain limit. This adaptable crack movement can allow the composite to dissipate an additional energy associated with autonomous tear elimination $\Gamma_A$, as shown in FIGS. 9A-B, and increase the total energy dissipation to $\Gamma_T = \Gamma_0 + \Gamma_D + \Gamma_A$. This new mode of crack deflection/elimination extends energy dissipation ($\Gamma_A$) throughout the whole area of the composite and activates significantly larger area compared to the smaller area of process zone inside particle-filled composite. This increase in active dissipation area can dramatically enhance the total energy dissipation ($\Gamma_T$).

To measure fracture energy, a pure shear fracture test method can be used that had previously been adopted for soft materials. In this method, a notch is cut into a sample and then the sample is stretched to determine the onset of failure (maximum force). The fracture energy Γ corresponds to the energy required to stretch an un-notched sample to the same displacement, divided by the cross-sectional area. As shown in FIGS. 10(*i*)-(*iii*), a sheet of homogenous (unfilled) silicone (Ecoflex 00-30, Smooth-On) with a notch is stretched. The tensile force reaches a maximum at ≈100% of strain, at which point the notch continuously propagates horizontally to complete failure. In order to compare the effects of liquid inclusions with rigid inclusions, the inventors embedded microdroplets of rigid, indium-based low melting point alloy (Bi—In—Sn; Field's metal) inside the same silicone matrix. With the addition of rigid inclusions, energy dissipation increases near the crack tip. FIGS. 11(*i*)-(*v*) shows a sample of rigid particle embedded elastomer (RPEF) with 30% volume ratio of rigid inclusions. The optical image at 0% strain shows the morphology of polydispersed rigid inclusions, with major axes of 14.2±4.4 μm close to the crack tip. As the sample is stretched, the rigid inclusions do not deform and are observed to slip and tear from the surrounding rubber. This is due to the stiffness mismatch between the host elastomer and the particles and results in an increase in the overall stiffness of the composite. As shown in the optical image of crack tip at 200% strain, the debonding of rigid inclusions create many voids, around which the surrounding polymer is highly stretched. This delamination and localized stretching greatly increases the dissipation of energy and the resistance against the propagation of tear. The crack eventually unzips horizontally through the sample (similar to the unfilled elastomer) and causes complete failure at a strain of ≈320%.

Figure 12:
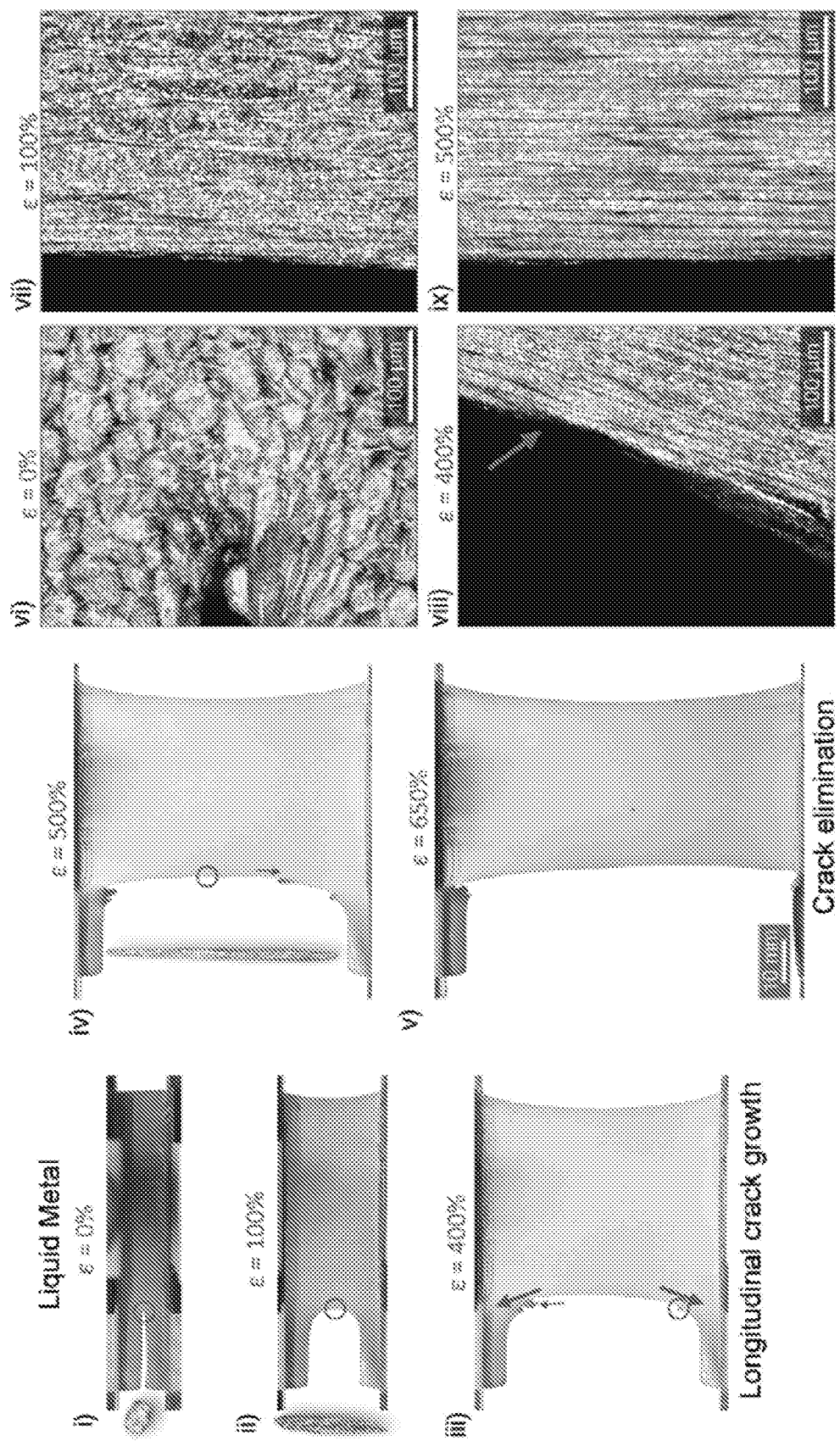

The mechanical response of the LMEE composite is significantly different from those with RPEFs and unfilled silicone. In contrast to rigid inclusions, liquid droplets can deform with the surrounding elastic medium. FIGS. 12(*i*)-(*ix*) show different snapshots of a notched LMEE sample with 10 mm initial length and 50% volume ratio of LM. The major axis of an inclusion at 0% strain (FIG. 12*vi*) is 21±6 μm, similar to what is measured in an RPEF As the notched sample is stretched, the liquid inclusions elongate with the background strain field. Subsequently, close to the crack edge, the high local strain field results in higher droplet elongation compared to those that are far from the tear. The length scale of the process zone is around 650 μm. A new mechanism of toughening emerges for LMEE composites with a high volume fraction of liquid metal (φ ≥ 50%). As shown in FIG. 12*iii*, a small step-like crack located in the process zone starts moving longitudinally along the direction of stretch. During this longitudinal movement, the tear moves along the interface of elongated liquid inclusions and elastomer. It occasionally ruptures a liquid droplet or transmits to the neighboring inclusion and moves vertically (see FIGS. 12*iii, iv* and *viii*). This adaptive movement of the tear leads to a complete elimination of the initial notch (see FIGS. 12*v* and *ix*). Eventually, the tensile strain limit of the LMEE sample with a notch approaches that measured for ultimate strain at break of an un-notched sample, as shown in FIG. 11A.

In the pure shear test, it is assumed that the process zone in the front of the crack tip is small relative to the overall dimensions of the sample such that the boundaries (clamps) do not have any influence. However, this assumption is not valid for the case of vertical crack movement where the crack travels along the applied load. For the case of LMEE samples (φ=50%) with shorter sample length (L=5 mm), the longitudinal crack reflects from the walls, and the boundary interference leads to premature failure. In order to remove the boundary effects, the inventors performed the pure-shear fracture test with longer sample lengths. The experimental results show an increase in fracture energy of LMEE (φ=50%) as the length increases from L=5 to L=7.5 mm (green bars in FIG. 13B). However, for L ≥ 7.5 mm, Γ is invariant to sample length and reaches its peak value. Hence, all the values for fracture energy of LMEEs with vertical crack movement (φ≥45%) are reported for L=10 mm. As shown with grey bars in FIG. 13B, such a length dependency on fracture energy is not observed for the case of unfilled elastomer, which only exhibits horizontal crack movement for all sample lengths. Moreover, by changing the crack length of LMEE samples with φ=50%, from 10 to 30 mm, the critical strain ($\varepsilon_c$) remains similar. Depending on the volume fraction of LM (φ), observe two distinct regions are observed. With reference to FIGS. 13C and D, fracture behavior in region I (φ ≤ 40%) is dominated by energy dissipation of inclusions, while in region II (φ ≥ 45%) it is dominated by longitudinal crack movement and notch elimination. FIG. 13C shows the increase in strain at maximum tensile force for notched samples with different liquid metal loadings. The increase in critical strain is smooth and monotonic up to φ=40%. In this region, fracture energy increases steadily from Γ=250±50 J m$^{-2}$ for the unfilled elastomer to Γ=2, 360±160 J m$^{-2}$ for a 40% volume ratio LMEE (FIG. 13D). In region I, RPEE shows a similar trend and slightly higher fracture energy compared to LMEE (with 95% confidence bound), which could be attributed to more energy dissipation due to slipping and friction between rigid particles and the polymer (FIG. 13E). However, in region II (φ ≥ 45%), LMEE shows a sharp increase in critical strain as well as fracture energy. For these materials, the crack moves longitudinally and enhances the fracture energy significantly. However, by increasing volume fraction of LM even higher than 50%, the critical strain decreases (see FIG. 13C, region II) and the experimental data shows a slight decrease in the fracture energy (see FIG. 13D, region II). Additionally, FIG. 13F shows the enhancement in fracture energy as a function of tensile modulus (the slope of stress vs strain curves between 10% and 20% of strain) measured during the initial loading cycle (before the effect of strain softening, i.e., Mullins effect, appears). The dashed lines are the curves for different values of the elasto-adhesive length scale, $\rho^* = \Gamma/E$, which is indicative of the length in front of crack tip where the material experiences large strain. As shown here, LMEE increases the length of active energy dissipation from ≈3 mm to more than 50 mm, in contrast to RPEE where the increase in $\rho^*$ is modest ($\rho^*$<10 mm). Hence, liquid inclusions are much more effective in increasing tear resistance while maintaining greater compliance and stretchability when compared to composites with rigid inclusions.

In both composites with rigid and liquid inclusions, the presence of filler increases the size of the process zone and delocalizes the strain energy in front of a crack tip, thereby increasing the total energy dissipation. Recently, it was shown that high energy dissipation can be attributed to the Mullins effect. In this theory, $\Gamma/\Gamma_0 = 1/(1-\alpha h_{max})$, where $h_{max}$ is the ratio between the energy dissipated and maximum mechanical work being done on the material, and $0<\alpha<1$ is a nondimensional number depending on the stress-strain hysteresis. The maximum enhancement predicted by this theory is around 10×, which is generally in agreement with the results for φ ≥ 40%. However, it severely underpredicts the toughening enhancement of the sample with adaptable crack movement observed at high volume fractions of LM (≥ 50%), which is on the order of 50×. This discrepancy is due to the special role of the elongated liquid inclusions, which guide the crack to move vertically and prevent propagation of the tear across the whole sample. This mechanism is analogous to that in tough bones, where a micro crack starts moving perpendicularly to the loading direction and then twists. If the interfacial binding energy of LM and polymer is comparable to the cohesion energy, a vertical crack will be initiated that moves perpendicular to the direction of original crack. Accordingly, this secondary crack greatly decreases the stress concentration in front of the existing crack and results in an increase in the energy dissipation and toughness of the composite. As shown in FIG. 13B, an enhancement in fracture energy $\Gamma$ of up to 50× is observed compared to the host silicone elastomer for Ecoflex LMEE with 50% volume ratio of LM. This additional toughening behavior is not only a result of higher energy dissipation of filler inclusions, but also arises from the geometrical effect of adaptable crack movement. Using a silicone elastomer composite with 50% LM loading and a higher base fracture energy (Dragon Skin 10 slow, $\Gamma_0=930\pm80$ J m$^{-2}$), the fracture energy of the composite was enhanced to $\Gamma=33,500\pm4300$ J m$^{-2}$ (FIG. 13B blue bars). In addition to achieving ultratoughness, the resistance to tearing is omni-directional in LMEE composites as the inclusions adapt their orientation to the loading direction. This is in contrast to most other engineered or biological tough materials (e.g., fiber reinforced composites and bones), which have anisotropic toughness and resistance against tearing only along certain loading directions. For these materials, the relative angle of the initial crack can have a significant influence on fracture strength. This can be of critical importance in applications where cracks are initiated in random directions.

More details about the improved qualities of LMEEs and the above-described testing can be found in N. Kazem et al., "Extreme Toughening of Soft Materials with Liquid Metal," Advanced Materials 30 (22), 1706594 (2018), which is incorporated herein by reference in its entirety.

In various embodiments, therefore, the present invention is directed to a method of fabricating a thermally conductive, stretchable elastomer composite. The method comprises mixing liquid metal and a soft material in a centrifugal mixer or an industrial shear mixer under conditions such that the liquid metal forms microscale liquid metal droplets that are dispersed in the soft material.

In various implementations, the method further comprises, prior to mixing with the centrifugal or industrial shear mixer, mixing the liquid metal and the soft material for a period of time using a stirring rod. In various implementations, the centrifugal mixer comprises a planetary centrifugal mixer. The industrial shear mixer may comprise a disperser or an agitator.

Also, the liquid metal may comprise between 10% and 80% by volume of the composite, such as between 40% and 60% by volume of the composite, for example. Still further, the mixing of the liquid metal and the soft material may comprise mixing the liquid metal and the soft material such that at least 80% of the liquid droplets have a major axis dimension of between 4 and 30 microns.

In various implementations, the soft material may comprise a soft elastomer, an oil, an epoxy, and/or a wax. Where the soft material comprises a soft elastomer, the soft elastomer may comprise polysiloxane, polyurethane, natural rubber, a block copolymer elastomer, and/or thermoplastic elastomer. Also, the liquid metal may comprise a room-temperature liquid metal such as EGaIn, gallium-indium-tin, Indalloy, NewMerc, and/or mercury.

While various embodiments of the present invention have been shown and described, it should be understood that other modifications, substitutions and alternatives are apparent to one of ordinary skill in the art. Such modifications, substitutions, and alternatives can be made without departing from the spirit and scope of the invention, which should be determined from the appended claims.

What is claimed is:

1. A method of fabricating a thermally conductive, stretchable elastomer composite, the method comprising mixing liquid metal and a soft material in a centrifugal mixer under conditions such that the liquid metal forms microscale liquid metal droplets that are dispersed in the soft material, wherein the liquid metal is liquid at room temperature, wherein the composite comprises a strain of at least 100%, and wherein the microscale liquid metal droplets comprise a major axis dimension in a range of 1 to 100 microns.

2. The method of claim 1, further comprising, prior to mixing with the centrifugal mixer, mixing the liquid metal and the soft material for a period of time using a stirring rod.

3. The method of claim 1, wherein the centrifugal mixer comprises a planetary centrifugal mixer.

4. The method of claim 1, wherein the composite comprises an amount of the liquid metal of at least 10% by volume of the composite.

5. The method of claim 1, wherein the composite comprises an amount of the liquid metal in a range of 40% to 60% by volume of the composite.

6. The method of claim 1, wherein mixing the liquid metal and the soft material comprises mixing the liquid metal and the soft material such that at least 80% of the liquid droplets have a major axis dimension in a range of 4 to 30 microns.

7. The method of claim 1, wherein the liquid metal comprises eutectic gallium indium.

8. The method of claim 7, wherein the soft material comprises a soft elastomer, an oil, an epoxy, a wax, or a combination thereof.

9. The method of claim 7, wherein the soft material comprises a soft elastomer.

10. The method of claim 9, wherein the soft elastomer comprises polysiloxane.

11. The method of claim 9, wherein the soft elastomer comprises polysiloxane, polyurethane, natural rubber, a block copolymer elastomer, thermoplastic elastomer, or a combination thereof.

12. The method of claim 1, wherein the liquid metal comprises gallium, a gallium alloy, a tin alloy, an antimony alloy, mercury, or a combination thereof.

13. The method of claim 12, wherein the soft material comprises a soft elastomer, an oil, an epoxy, a wax, or a combination thereof.

14. The method of claim 12 wherein, the liquid metal comprises a gallium alloy selected from the group consisting of eutectic gallium indium and gallium-indium-tin.

15. The method of claim 1, wherein the soft material comprises a soft elastomer, an oil, an epoxy, a wax, or a combination thereof.

16. The method of claim 15, wherein the composite comprises an amount of the liquid metal in a range of 40% to 60% by volume of the composite.

17. The method of claim 1, wherein the soft material comprises a soft elastomer, and wherein the soft elastomer comprises a polysiloxane, polyurethane, natural rubber, a block copolymer elastomer, thermoplastic elastomer, or a combination thereof.

18. The method of claim 1, wherein:
the composite comprises an amount of the liquid metal in a range of 10% to 80% by volume of the composite;
mixing the liquid metal and the soft material comprises mixing the liquid metal and the soft material such that at least 80% of the liquid droplets have a major axis dimension of in a range of 4 to 30 microns;

the soft material comprises a soft elastomer, an oil, an epoxy, a wax, or a combination thereof; and the liquid metal comprises gallium, a gallium alloy, a tin alloy, an antimony alloy, mercury, or a combination thereof.

19. A method for fabricating an elastomer composite, the method comprising:

forming a composition comprising;

5% to 80% by volume of a liquid metal, wherein the liquid metal is liquid at room temperature; and an elastomer;

mixing the composition in a centrifugal mixer to form liquid metal droplets from the liquid metal and dispersing the liquid metal droplets through the elastomer thereby forming an elastomer composite, wherein at least 80% of the liquid metal droplets comprise a major axis dimension in a range of 4 to 30 microns after mixing in the centrifugal mixer.

20. The method of claim 19, further comprising curing the elastomer composite.

21. The method of claim 20, wherein the cured elastomer composite comprises a strain of at least 100%.

22. The method of claim 19, wherein the centrifugal mixer comprises a planetary centrifugal mixer.

23. The method of claim 19, wherein the elastomer comprises polysiloxane, polyurethane, natural rubber, a block copolymer elastomer, thermoplastic elastomer, or a combination thereof, and the liquid metal comprises gallium, a gallium alloy, a tin alloy, an antimony alloy, mercury, or a combination thereof.

* * * * *